(12) United States Patent  
Plut

(10) Patent No.: US 8,130,241 B2  
(45) Date of Patent: *Mar. 6, 2012

(54) GRAPHICS ITEMS THAT EXTEND OUTSIDE A BACKGROUND PERIMETER

(75) Inventor: William J. Plut, Menlo Park, CA (US)

(73) Assignee: Transpacific Image, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/037,945

(22) Filed: Mar. 1, 2011

(65) Prior Publication Data

US 2011/0148920 A1   Jun. 23, 2011

Related U.S. Application Data

(63) Continuation of application No. 11/768,820, filed on Jun. 26, 2007, now Pat. No. 7,928,994, which is a continuation-in-part of application No. 10/891,733, filed on Jul. 15, 2004, now Pat. No. 7,274,382.

(60) Provisional application No. 60/487,760, filed on Jul. 16, 2003.

(51) Int. Cl.  
*G09G 5/02* (2006.01)

(52) U.S. Cl. ........................................ 345/629

(58) Field of Classification Search .................. 345/629  
See application file for complete search history.

(56) References Cited

U.S. PATENT DOCUMENTS

| | | |
|---|---|---|
| 3,793,483 A | 2/1974 | Bushnell |
| 4,227,215 A | 10/1980 | Gurley |
| 5,170,196 A | 12/1992 | Itoh |
| 5,193,006 A | 3/1993 | Yamazaki |
| 5,208,669 A | 5/1993 | Richards |
| 5,216,504 A | 6/1993 | Webb |
| 5,227,771 A | 7/1993 | Kerr |
| 5,475,812 A | 12/1995 | Corona |
| 5,477,241 A * | 12/1995 | Higgins et al. ............... 345/661 |
| 5,572,259 A | 11/1996 | Nohara |
| 5,586,244 A | 12/1996 | Berry |
| 5,592,194 A | 1/1997 | Nishikawa |
| 5,642,476 A | 6/1997 | Turner |
| 5,657,049 A | 8/1997 | Ludolph |
| 5,657,463 A | 8/1997 | Bingham |
| 5,668,997 A | 9/1997 | Lynch-Freshner |
| 5,680,562 A | 10/1997 | Conrad et al. |
| 5,704,050 A | 12/1997 | Redpath |
| 5,757,358 A | 5/1998 | Osaga |
| 5,764,241 A | 6/1998 | Elliott |
| 5,784,045 A | 7/1998 | Cline |
| 5,793,434 A | 8/1998 | Lee |
| 5,796,402 A | 8/1998 | Ellison-Taylor |

(Continued)

OTHER PUBLICATIONS

US Office Action dated Apr. 30, 2010 for U.S. Appl. No. 11/768,820, 30 pages.

(Continued)

*Primary Examiner* — Javid Amini

(74) *Attorney, Agent, or Firm* — Turocy & Watson, LLP

(57) ABSTRACT

Described herein are methods and systems that allow a user to reposition or size a graphics item or background such that a portion of the graphics item resides outside the background. This permits tailored operating spaces based on user preference and allowable conditions, which are particularly useful with display devices having a large display area.

31 Claims, 6 Drawing Sheets

U.S. PATENT DOCUMENTS

| | | | |
|---|---|---|---|
| 5,815,160 | A | 9/1998 | Kikuchi |
| 5,838,321 | A | 11/1998 | Wolf |
| 5,896,121 | A | 4/1999 | Kafer |
| 5,901,319 | A | 5/1999 | Hirst |
| 5,914,716 | A | 6/1999 | Rubin |
| 5,978,051 | A | 11/1999 | Gohman |
| 5,983,190 | A | 11/1999 | Trower, II |
| 6,023,714 | A | 2/2000 | Hill |
| 6,028,645 | A | 2/2000 | Reid |
| 6,067,112 | A | 5/2000 | Wellner |
| 6,076,169 | A | 6/2000 | Lee |
| 6,195,068 | B1 | 2/2001 | Suzuki |
| 6,215,490 | B1 | 4/2001 | Kaply |
| 6,300,936 | B1 | 10/2001 | Braun |
| 6,345,897 | B1 | 2/2002 | Furuhata |
| 6,356,284 | B1 | 3/2002 | Manduley |
| 6,367,933 | B1 | 4/2002 | Chen |
| 6,396,520 | B1 | 5/2002 | Ording |
| 6,404,458 | B1 | 6/2002 | Kang |
| 6,426,836 | B2 | 7/2002 | Dorsel |
| 6,437,787 | B1 | 8/2002 | Wu |
| 6,456,305 | B1 | 9/2002 | Qureshi |
| 6,462,868 | B1 | 10/2002 | Giesberg |
| 6,466,193 | B1 | 10/2002 | Anai |
| 6,471,356 | B1 | 10/2002 | Gohman |
| 6,473,102 | B1 * | 10/2002 | Rodden et al. ............... 715/788 |
| 6,481,852 | B2 | 11/2002 | Osaka |
| 6,486,900 | B1 | 11/2002 | Shen |
| 6,491,400 | B1 | 12/2002 | Chen |
| 6,520,646 | B2 | 2/2003 | Rodriguez, Jr. |
| 6,520,647 | B2 | 2/2003 | Raskar |
| 6,583,779 | B1 | 6/2003 | Ushirono |
| 6,594,090 | B2 | 7/2003 | Kruschwitz |
| 6,606,103 | B1 | 8/2003 | Hamlet |
| 6,750,832 | B1 | 6/2004 | Kleinschmidt |
| 6,757,034 | B2 | 6/2004 | Yu |
| 6,806,848 | B2 | 10/2004 | Hirao |
| 6,807,010 | B2 | 10/2004 | Kowarz |
| 6,864,921 | B2 | 3/2005 | Kaneda |
| 6,963,348 | B2 | 11/2005 | Diamond et al. |
| 7,274,382 | B2 | 9/2007 | Plut |
| 7,292,252 | B2 | 11/2007 | Matsuda |
| 7,623,135 | B1 | 11/2009 | Diamond et al. |
| 7,706,979 | B1 * | 4/2010 | Herwitz ............... 701/301 |
| 2002/0080176 | A1 | 6/2002 | Nason |
| 2002/0158884 | A1 | 10/2002 | Gonzalez |
| 2003/0020757 | A1 | 1/2003 | Aratani et al. |
| 2003/0020885 | A1 | 1/2003 | Suzuki |
| 2003/0071846 | A1 | 4/2003 | Balassanian |
| 2003/0085926 | A1 | 5/2003 | Heynderickx |
| 2003/0142135 | A1 | 7/2003 | Hori et al. |
| 2004/0036813 | A1 * | 2/2004 | Matsuda ............... 348/744 |
| 2004/0113939 | A1 | 6/2004 | Zacks |
| 2004/0227911 | A1 | 11/2004 | Salvatori et al. |
| 2005/0017978 | A1 | 1/2005 | Hatori et al. |
| 2006/0048062 | A1 | 3/2006 | Adamson |
| 2007/0257941 | A1 | 11/2007 | Plut |

OTHER PUBLICATIONS

US Office Action dated Jul. 9, 2010 for U.S. Appl. No. 11/765,296, 35 pages.

US Office Action dated Jan. 5, 2009 for U.S. Appl. No. 11/765,296, 25 pages.

US Office Action dated Apr. 10, 2009 for U.S. Appl. No. 11/765,296, 20 pages.

US Office Action dated Sep. 15, 2009 for U.S. Appl. No. 11/765,296, 22 pages.

US Office Action dated Nov. 12, 2010 for U.S. Appl. No. 11/765,296, 49 pages.

US Office Action dated Sep. 29, 2010 for U.S. Appl. No. 11/768,820, 26 pages.

* cited by examiner

GRAPHICS ITEMS THAT EXTEND OUTSIDE A BACKGROUND PERIMETER

CROSS-REFERENCE TO RELATED APPLICATIONS

This application is a continuation of U.S. patent application Ser. No. 11/768,820, entitled "GRAPHICS ITEMS THAT EXTEND OUTSIDE A BACKGROUND PERIMETER" and filed on Jun. 26, 2007, which is a continuation-in-part of U.S. patent application Ser. No. 10/891,733 (now U.S. Pat. No. 7,274,382), entitled "CUSTOMIZABLE BACKGROUND SIZES AND CONTROLS FOR CHANGING BACKGROUND SIZE" and filed on Jul. 15, 2004, which claims priority under 35 U.S.C. §119(e) from U.S. Provisional Patent Application No. 60/487,760, filed Jul. 16, 2003, and entitled "CUSTOMIZABLE USER INTERFACE BACKGROUND SIZES". The entirety of each of the above-referenced applications is incorporated by reference herein.

BACKGROUND

This invention relates to graphics items used with a graphics-based user interface. More particularly, the present invention relates to positioning, sizing, and usage of graphics items outside a background.

Computers and computer programs employ a graphics-based user interface to facilitate interaction between a user and a computer or between the user and a computer program run on the computer. The graphics-based user interface commonly employs a background, which includes a bitmap digitally represented by an array of pixel values.

Conventional backgrounds maximally fill the entire two-dimensional display area for a display device, such as a cathode ray tube (CRT) or liquid crystal display (LCD) screen. The background size cannot be manipulated, selected, or changed by a user—its maximal size remains singularly and stringently fixed. The background also defines the usable limits of the graphics-based user interface. Graphics items, such as windows, used with the graphics-based user interface are limited to positioning and display within the background perimeter.

OVERVIEW

Described herein are methods and systems that allow a user to manually reposition or size a graphics item or background such that a portion of the graphics item resides outside a perimeter of the background.

In one aspect, the present invention relates to a method of customizing an operating space for a graphics-based user interface. The method includes displaying a background and a graphics item in the background. The method also includes displaying a graphics tool configured to permit a user to reposition or resize the graphics item or the background such that a portion of the graphics item resides outside the background. The method further includes receiving input from the user that indicates a change in the graphics item or a change in the background such that a portion of the graphics item resides outside the background. The method additionally includes displaying the graphics item with the portion of the graphics item residing outside the background.

In one embodiment, the graphics item includes an anchor that is not permitted to be positioned outside a perimeter of the background. This provides spatial continuity between the background and graphics item.

In another aspect, the present invention relates to a computer readable medium including instructions for customizing an operating space for a graphics-based user interface.

These and other features of the present invention will be presented in more detail in the following detailed description of the invention and the associated figures.

DESCRIPTION OF EMBODIMENTS

Figure 1A:
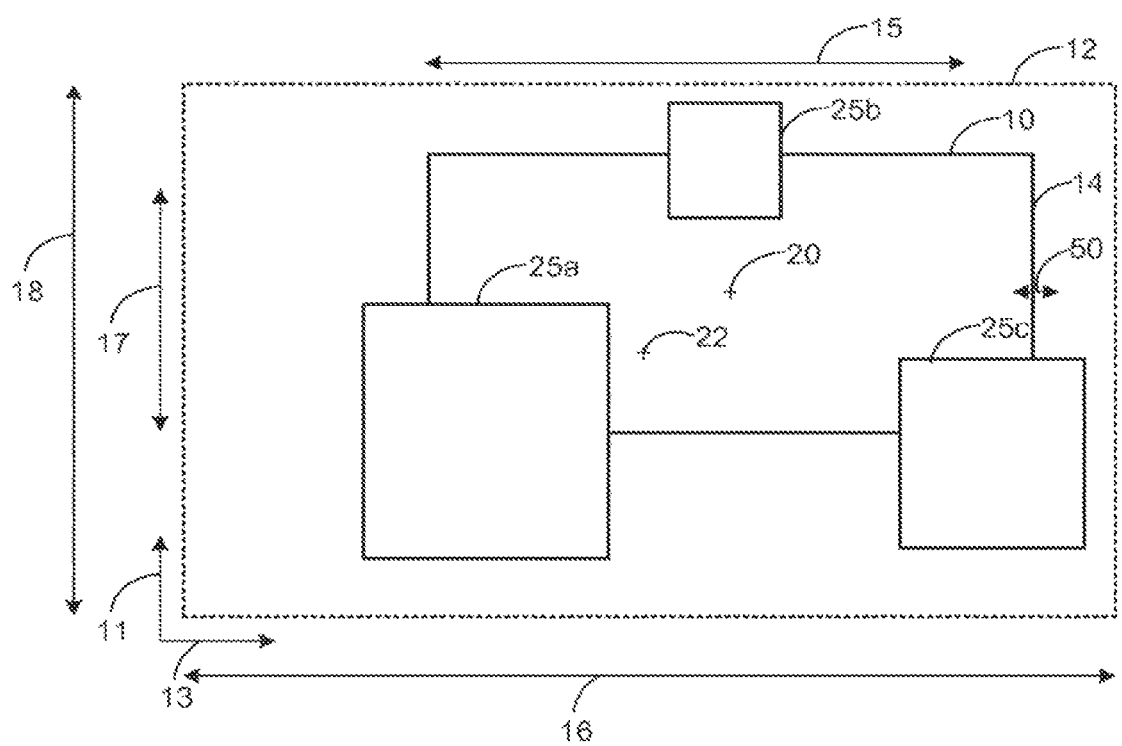
FIG. 1A shows an illustrative spatial relationship between three graphics items and a background in accordance with a specific embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Described herein are embodiments that permit a user to customize the spatial relationship between a graphics item and a background such that a portion of the graphics item resides outside the background perimeter.

In one embodiment, methods and systems described herein allow a user to manually change and customize a background size for a background used with a graphics-based user interface. Changing the background size typically reduces the background size to less than a maximum image size available from a display device. For example, a user may shape or size a background to fit a workspace or other area, such as the walls of cubicle (see FIG. 1B for example).

Windows and other graphics items may then be moved and shaped outside the size-reduced background to further permit manual customization of a workspace.

Since conventional backgrounds were stringently restricted to a single maximum size, users conformed to limited practice with a graphics-based user interface. The methods and systems described herein, however, allow for expanded interaction between a user and graphics-based user interface. This interaction may include: i) tailoring a background shape, size and aspect ratio, and ii) moving or sizing one or more graphics items that such a portion of the one or more graphics items resides outside the customized background.

This enables tailored background sizes and graphics items displayed at least partially outside the background, based on user preference and allowable conditions, which are particularly useful with display devices having a large display area.

Projectors, for example, offer image sizes having diagonal spans up to 30 feet. Imperfect and realistic environment conditions complicate the use of large projected images. Thine size for a projector traditionally depended on mechanical factors such as the distance from a projector to the receiving surface and a splay angle for the projection lens. It is common for light output by a projector to encounter physical obstacles—either along a projection path between a projector and receiving surface, at the receiving surface, or both. A projector used in an office or home may encounter a wide variety of projection path obstacles, such as plants, bookshelves, chairs, miscellaneous furniture, etc., that limit where the projector is placed and where the image is cast. Obstacles at the receiving surface traditionally forced a user to move a projector closer to the wall to reduce image size. Any obstacles along the path between the projector and receiving surface also forced a user to move the projected image and/or projector. The lack of mobility for many projectors, such as those fixed into a ceiling and those that require a minimum throw distance, adds to projector and image placement difficulties. The stringency of maximally-sized backgrounds offered by conventional graphics-based user interfaces amplifies these complications.

The methods and systems described herein, however, enable a user to tailor a background size, which allows a user to manually navigate obstacles in the projection path and maximize image size based on specific projection conditions. For example, a user may tailor projector output used in a living room or office to navigate projection path or receiving surface obstacles that normally would obstruct the projection path and limit where the projector is placed, where the receiving image is cast, and/or limit image size.

This also enables new uses for projectors. Cubicles and other portable office environments offer limited wall space. Projectors are currently not used in these environments due to the limited receiving surface space and projection path obstacles. The methods and systems described herein enable a worker within confined spaces such as these to tailor the background size and usable area to their local environment allowances (see FIG. 1B). Thus, if the unobstructed wall space and projection path allow a rectangular image having an aspect ratio of 3:1, the user may tailor a background size to maximally fit the available area. Also, the user may move graphics items outside the background into gaps in the wall space according to their current wall space conditions. Previously, the user would be forced to move the projector closer to the wall (if possible), maintain a 4:3 aspect ratio image set by the projector and graphics-based user interface, keep windows within this smaller background, and therefore use less than half the available area.

By custom sizing and positioning a background to current conditions, and sizing and positioning one or more graphics items partially outside the background as desired, a user may navigate an image among obstacles at the receiving surface and obstacles along a projection path between a projection lens and the receiving surface.

FIG. 1A shows an illustrative spatial relationship between three graphics items 25 and a background 10 in accordance with a specific embodiment of the present invention. Background 10 and graphics items 25 are intended for use with a graphics-based user interface employed by a computing system and device that utilize a display device for visual output. Background 10 includes a size that is less than the maximum image size allowed by a display device. In one embodiment, background 10 is output by a projection type display device and includes an images cast onto a wall or other surface.

Background 10 includes video information for display according to orthogonal image coordinates. The background video information refers to data for display according to a pixel arrangement to produce a visual representation of the data. The data is stored in a logical manner using values for each pixel, usually based on a given pixel resolution that may or may not match the display device resolution. Picture files used in a background commonly comprise video information stored as a bitmap, which comprises an array of luma and/or chroma values for each pixel in the stored image. Color bitmaps may be stored as ".BMP" files using pixel depths such as 8, 16, 24, and 32 bits. Other graphics formats, such as GIF, JPEG, and others, can also be used to store a background image.

The orthogonal image coordinates refer to a stored data format, positional arrangement for pixels, or an assumed output format for display of the video information. Pixel values are usually assigned or stored according to a positional arrangement of pixels in a planar image, such as a right angle x-y coordinate system. The x-y coordinate pixel locations are then used to determine where video data is output on an image, such as that provided by an LCD screen or an optical modulator included in a projector.

Characterizing video information according to orthogonal image coordinates denotes how they are stored and/or intended for display, and not necessarily how they are actually cast or displayed. Thus, the present invention anticipates that the output image may not always be truly orthogonal. For a CRT monitor for example, it is understood that the actual image coordinates may not always be perfectly orthogonal to a viewer, e.g. due to slight curvature in the output screen for CRT monitor. Image coordinates produced for a projected image may also not always be truly orthogonal. When a projection lens that outputs the video information for a projector has a central axis that is not perpendicular to a receiving surface, keystone distortion of the image may appear. Briefly, keystone distortion results from portions of a receiving surface being closer to the projection lens and other portions of the receiving surface being farther. Since image size for a projector depends on distance from the projection lens image sizes for the closer receiving surface portions are smaller than those farther away. Keystone distortion often produces a trapezoidal image for rectangular video information intended for display according to orthogonal image coordinates. Many conventional projectors include a mechanical or digital keystone correction tool for reducing keystone distortion.

Background 10 includes a size that is less than a maximum image size 12 allowed by a display device when the background 10 video information is for display without substantial keystone distortion (e.g., after any keystone correction). It is understood that correction of keystone distortion may not always produce perfectly orthogonal image pixels. More specifically, manual keystone correction often relies on user feedback to indicate when an image output by a projector has been substantially keystone corrected. Since this process is based on an individual user's acceptable viewing conditions and visual abilities, it is understood that images produced by projectors may not always include truly orthogonal image coordinates. Acceptable keystoning in this case may include up to 10 percent error, for example. Even projectors employing automated keystone correction, via a camera or other automated sensor to indicate an amount of potential distortion, may be subject to slight deviation from a true orthogonal image after the image has been substantially corrected.

Size changes to background 10 are independent of keystone correction. Thus, for an LCD screen that does not include keystone distortion issues, this includes a background 10 size that is less than the maximum image size 12 allowed by the LCD screen. For a projector, changes in background size described herein may occur after keystone correction has occurred, if any. The background size changes are thus independent of changes made to attain an orthogonal image. In addition, size changes to a background as described herein are also independent of hardware tools or effects used to alter display device performance, such as hardware tools found on some CRT monitors that allow a user to shift or how video output, or zoom tools that allow a user to magnify portions of an image without changing the image size.

Background 10 is output by a display device having a maximum image size 12. The maximum image size 12 implies that the display device has a finite size when the background video information is for display without substantial keystone distortion. For a CRT screen, OLED device, LCD screen or plasma-based display, there is typically no keystone distortion and the maximum image size 12 may be quantified according to maximal pixel dimensions for the optical modulator, or measured according to maximal linear dimensions that span the display area. Maximum image size 12 is independent from any orthogonal imperfections in the device such as screen curvature in a CRT device; and also encompasses any manual and optical adjustments made to the image using tools on the display device, such as hardware outer screen size manipulations permitted by some CRT monitors.

For a projector, maximum image size 12 may be characterized using the maximum pixel dimensions for an optical modulator producing the image when the background video information is for display without substantial keystone distortion. Thus, maximum image size 12 is typically limited based on the optical modulation device (DMD or LCD) resolution. Maximum linear dimensions for a projector will vary with the distance between the receiving surface and projector output lens, as well as a splay angle for the projector, but may be measured on the image after any keystone distortion has been suitably corrected for. When the background video information is for display with substantial keystone correction, maximum image size 12 is the maximum image size available after any keystone distortion has been substantially corrected for.

A perimeter 14 of background 10 bounds background video information included in background 10 and acts as an outer border for the background size and shape. The perimeter 14 comprises the outermost pixels for the background, such as the outer pixels for a bitmap picture fit to the reduced size.

The perimeter of a prior art and conventional background (for a graphics-based user interface) represented both: 1) the outer boundary for display video information for the graphics-based user interface, and 2) the outer boundary for user input for the graphics-based user interface.

In one embodiment, background 10 separates these two. In this case, perimeter 14 defines the outer boundary for display of background video information, but not the outer boundary for user input for the graphics-based user interface.

The usable area and outer boundary for user input remains maximum image size 12, but may be subject to one or more constraints. In one embodiment, user input is limited to be within background 10 and graphics items 25. In this case, the user is not permitted to locate a pointer or perform other interface tasks within maximum image size 12 outside background 10 and graphics items 25. The usable area of maximum image size 12, though, defines visual output limits for graphics items 25 and how much they can be enlarged or repositioned outside of background 10. Thus, the usable area establishes spatial limits for display of graphics items 25 used by programs operated with the graphics-based user interface. For example, maximum image size 12 determines the visual limits for the display of windows, graphics controls, browsers, and other visual output included in the graphics-based user interface or programs run on a computer that employs the graphics-based user interface. Maximum image size 12 also determines the limit for user input, such as manipulating a pointer, opening a window, expanding or moving a window outside background 10, moving a graphics control or other graphics components—subject to the position and sizes of graphics items within maximum image size 12.

In a specific embodiment, background 10 size limits dimensions for a window or other graphics item 25*a* initially opened or displayed at full size. Size for the window or other graphics item 25*a* may subsequently be altered afterwards to a size larger or smaller than background 10.

Changing the background 10 size then changes the display of background video information, but not the usable area for the graphics-based user interface. Changing the background size may also relocate icons, control bars, and any other graphics components associated with visual output of the background.

Graphics items 25 are each for display as discrete visual objects and include video information related to a program stored and/or run on the computer. Popular programs include word processing programs, file navigation programs, Internet Browsers, drawing programs, music player programs, and video games, for example. Other programs are suitable for use. Rectangular windows are common graphics items and may vary in size from a maximum size that roughly spans maximum display area 12 to smaller sizes within maximum display area 12. Shapes other than rectangles, and spatial designs other than those shown, are also suitable for use. The rectangular windows may also be operated in minimized states where the program is active but the graphics item is not visible. A toggle on a control bar may allow user to switch between this minimum state and the state shown in FIG. 1A. For FIG. 1A, graphics item 25*a* includes a rectangular window that corresponds to a word processing program, graphics item 25*b* includes a window that corresponds to a file navigation program, and graphics item 25*c* includes a rectangular window that corresponds to a music player program. Each graphics item 25 may include their own bitmap comprising an array of pixel values. This allows video alteration as described herein to occur separately on an individual graphics item, if desired.

As will be described below, background 10 and each graphics item 25 may be resized and moved using one or more graphics tools.

Regions of maximum image size 12 outside of perimeter 14 and graphics items 25 remain visually unused. In one embodiment, the graphics-based user interface converts visual information outside perimeter 14 and graphics items 25 to an off state, zero, or black. For example, the graphics-based user interface may convert any pixel values for pixels outside perimeter 14 and graphics items 25 to zero or black for visual information output by programs associated with the graphics-based user interface, e.g. a screen saver would be black or off for pixels outside perimeter 14. For an LCD screen, back generated light may be fully blocked outside of perimeter 14 to create the appearance of black. For a projector, the optical modulator may not transmit light for these regions. In one embodiment, bitmaps stored for backgrounds of the present invention include zero values for pixels outside perimeter 14.

The size of background 10 may be characterized in a number of ways. One suitable technique for characterizing background 10 sizes uses two linear dimensions defined in the image plane. A two-dimensional image may be characterized by an outer width and orthogonal outer length. As described herein, 'width' refers to the horizontal dimension of a two-dimensional image, while 'length' refers to the vertical dimension. As shown in FIG. 1A, first and second orthogonal image directions 11 and 13 characterize maximum image size 12. An LCD screen for example comprises an orthogonal width 16 and length 18 that span the display area of the device (e.g., 12 inches by 9 inches, respectively). An area quantifying maximum image size 12 is then easily determined. A similar quantification may be made for other display devices, including images produced by a projector after suitable keystone correction. Directions 11 and 13 are also useful to quantify background 10 size. More specifically, background 10 may be defined by background dimensions 15 and 17 in directions 11 and 13, respectively. As shown in FIG. 1A, both background dimensions 15 and 17 are less than maximum image size dimensions 16 and 18 in directions 11 and 13, respectively.

Another suitable technique for characterizing background 10 sizes uses the total number of pixels included in background 10. When the maximum image size 12 for the display device is similarly quantified, background 10 size may be characterized relative to the maximum image size 12. For example, an LCD screen may have a resolution of 1600 by 1200 pixels, resulting in a maximum image size of 1,920,000 pixels. In one embodiment, background 10 has a non-quadrilateral shape and comprises an area based on a pixel count or similar quantification that approximates the non-quadrilateral size.

A user, using a graphics tool, may then input a desired ratio or percentage for background 10 size based on the maximum image size 12. The user may also input a preferred shape or aspect ratio (for a rectangular background). A processor or video adapter associated with the graphics control converts background video information included in background 10 according to the new size, including resolution down and/or up conversion of the video information, if needed. In one embodiment, background 10 has a size that is less than about 80 percent of maximum image size 12. In another embodiment, background 10 has a size that is less than about 50 percent of maximum image size 12. In another reduction embodiment, background 10 has a size that is less than about 30 percent of maximum image size 12.

The methods and system described herein permit a user to reposition and resize background 10 and/or each graphics item 25 using one or more graphics tools.

In one embodiment, the graphics tool uses point and drag functionality. In this case, for repositioning background 10 and/or each graphics item 25, the graphics-based user interface allows a user to 'drag' graphics components by moving an on-screen pointer or manipulanda to one or more locations of background 10 and/or each graphics item 25, such as a specific portion designated for this functionality, and then press a key, and move the background 10 and/or graphics item 25 while the key is pressed. The background 10 and/or graphics item 25 display 42 assumes the position it has when the key is released. The specific portion used to 'grab' the background 10 and/or graphics item 25 may include a designated location, such as a header portion, specific drag-tab, a border portion, or any other suitable portion of the background 10 and/or graphics item 25.

As illustrated in FIG. 1A, background 10 has been positioned or sized such that a geometric center 20 of background 10 is offset from a geometric center 22 of the maximum image size 12. The geometric center 22 is defined by a geometric center for the maximum image size 12.

In a specific embodiment, moving background 10 moves each graphics item 25. In another specific embodiment, background 10 and each graphics item 25 are independent and repositioning background 10 does not move each graphics item 25 (or vice versa). This second embodiment will now be expanded upon.

Notably, a position change for a graphics item 25 or background 10 may move portions of a graphics item 25 outside of background 10. As shown, each graphics item 25 includes a portion outside of background 10.

Figure 1B:
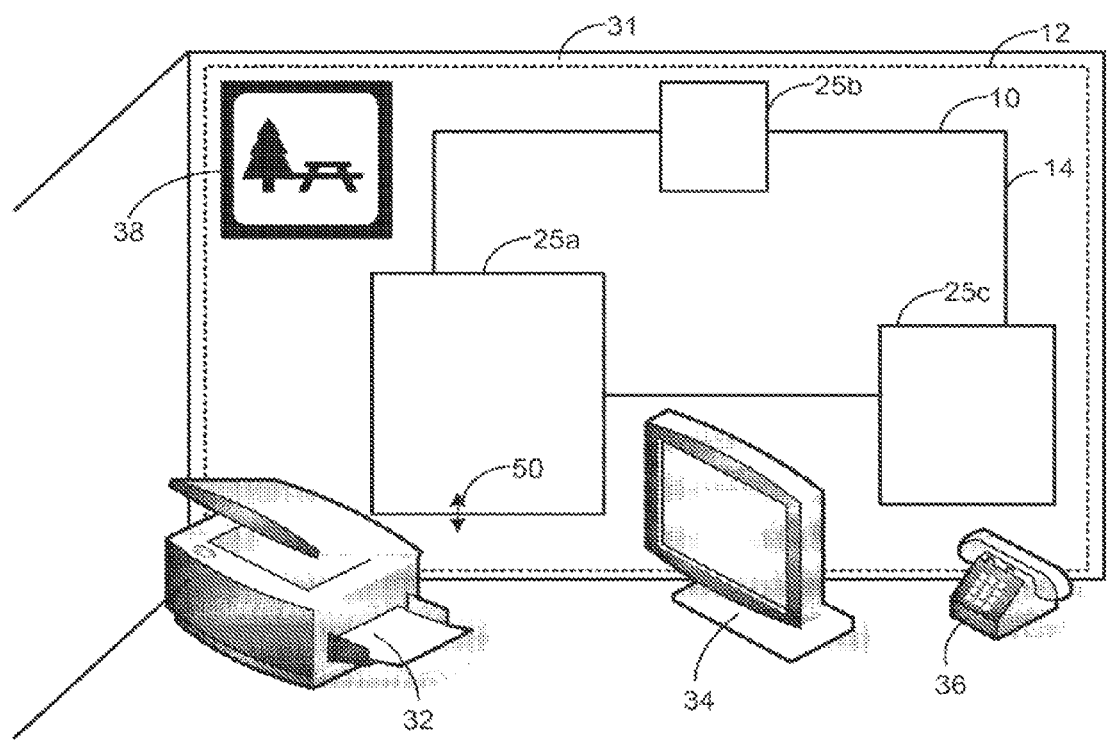
FIG. 1B illustrates the customization of a background and three graphics items to increase spatial utilization of a cubicle wall or office wall in accordance with a specific embodiment of the present invention.

In addition to dragging or otherwise moving portions of a graphics item 25 outside of background 10, the systems and methods permit a user to resize a graphics item 25 such that a portion of graphics item 25 rests outside of background 10. For example, a user may change the aspect ratio for a graphics item 25 using click and drag functionality. Many graphics-based user interfaces allow a user to change window sizes by moving an on-screen pointer or manipulanda to an edge of a window, pressing a key, and changing the window size while the button is pressed. This often brings up an arrow 50, as shown in FIG. 1B. The arrow 50 appears on a perimeter portion of a graphics item 25 and points in a direction normal to a direction for the edge on which it appears. The user may then press a key, and change the rectangular dimensions of the graphics item 25 in the normal direction while the button is pressed. The graphics item 25 assumes the new aspect ratio and size it has when the key is released, which may include re-sizing portions of the graphics item 25 outside of background 10.

A user may also resize background 10 using click and drag functionality. This may also lead to portions of the graphics item 25 outside of background 10 after the background size change. In this embodiment, a user may move an on-screen pointer or manipulanda to an edge of background 10 (FIG. 1A). At this point, an arrow 50 appears on perimeter 14 and points in a direction normal to a direction for the edge on which it appears. The user may then press a key, and change the rectangular dimensions of the background 10 while the button is pressed in the normal direction.

The result of this spatial flexibility in shaping and sizing both background 10 and graphics items 25, at least partially outside of background 10, is shown in FIG. 1B, in which the background 10 and graphics items 25 are sized to increase spatial utilization on a cubicle wall 31 or office wall 31. In this case, background 10 and graphics items 25 are sized to avoid printer 32, LCD panel 34, telephone 36, and hanging picture 38.

In one embodiment, limits are placed on the mobility and spatial relationships between background 10 and a graphics item 25. As described above, in some cases, a pointer may not be positioned anywhere in maximum image size 12—only within background 10 and/or a graphics item 25. In another embodiment to permit continuous movement between background 10 and/or a graphics item 25, the background) 10 and each graphics item 25 are spatially linked.

Figure 2A:
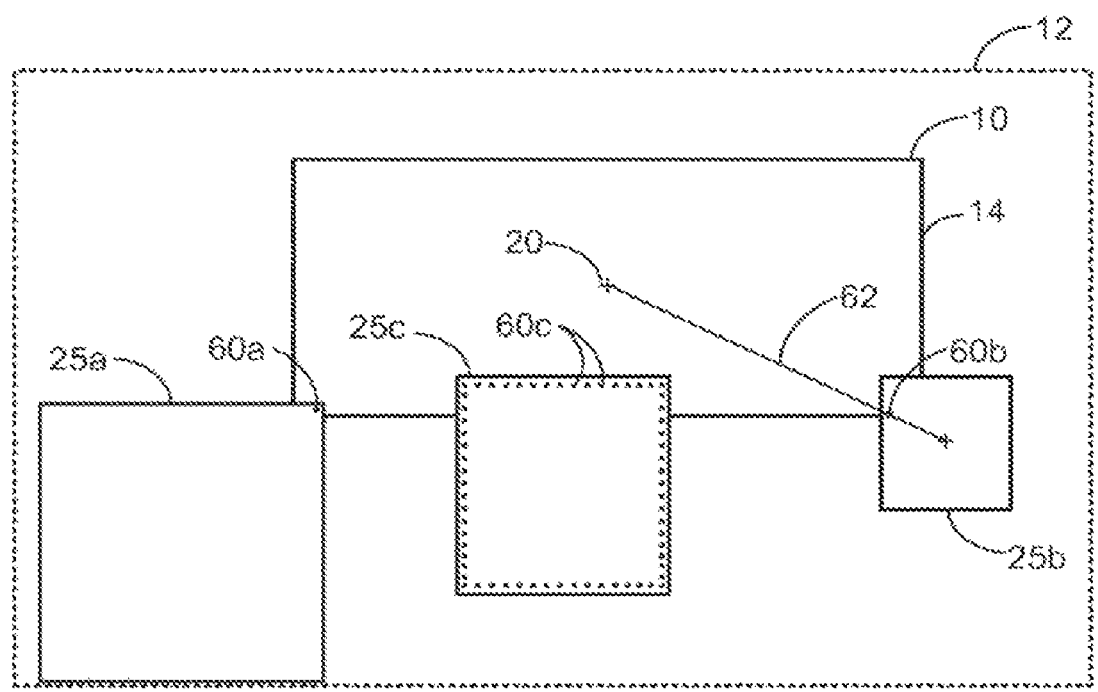
FIG. 2A shows anchor points for the graphics items of FIG. 1A in accordance with a specific embodiment of the present invention.

In a specific embodiment, an anchor is used to spatially link background 10 and a graphics item 25. The anchor is defined as a spatial location for display that is shared by background 10 and a graphics item 25. The anchor prevents display separation between background 10 and a graphics item 25. FIG. 2A shows anchors 60a-c for graphics item 25a-c of FIG. 1A, respectively, in accordance with a specific embodiment of the present invention.

In one embodiment, the anchor is a point. Anchor 60a includes a pixel included in both the upper right corner portion of graphics item 25a and a lower left corner portion of background 10 that overlap. In a specific embodiment, anchor 60a anchor includes a point location in graphics item 25a nearest to a geometric center 20 of background 10. Anchor 60a prevents graphics item 25a from being graphically separated from background 10. Any such movements or re-sizing of background 10 and/or graphics item 25a that result in anchor 60a not being shared by both graphics item 25a and background 10 may be denied by the graphical user interface and held at the most recent spatial relationship between the two that includes the anchor 60a.

Anchor 60b also includes a point. In this case, a line 62 is drawn between a center 20 of background 10 and a center of graphics item 25b. Anchor 60b includes a pixel that is the intersection of line 62 and the perimeter 14 of background 10. Similarly, any movements or re-sizing of background 10 and/or graphics item 25b that result in anchor 60b not being shared by both graphics item 25b and background 10 may be denied by the graphical user interface.

Anchor 60c includes multiple points/pixels. In this case, logic is used to determine which of the points/pixels in anchor 60c overlap between background 10 and graphics item 25c. Any movements or re-sizing of background 10 and/or graphics item 25c that result in zero anchor points/pixels 60c being shared by both graphics item 25c and background 10 may be denied by the graphical user interface. In other words, as long as any of the anchor points/pixels 60c are shared, movements or re-sizing of background 10 and/or graphics item 25c is permitted.

Figure 2B:
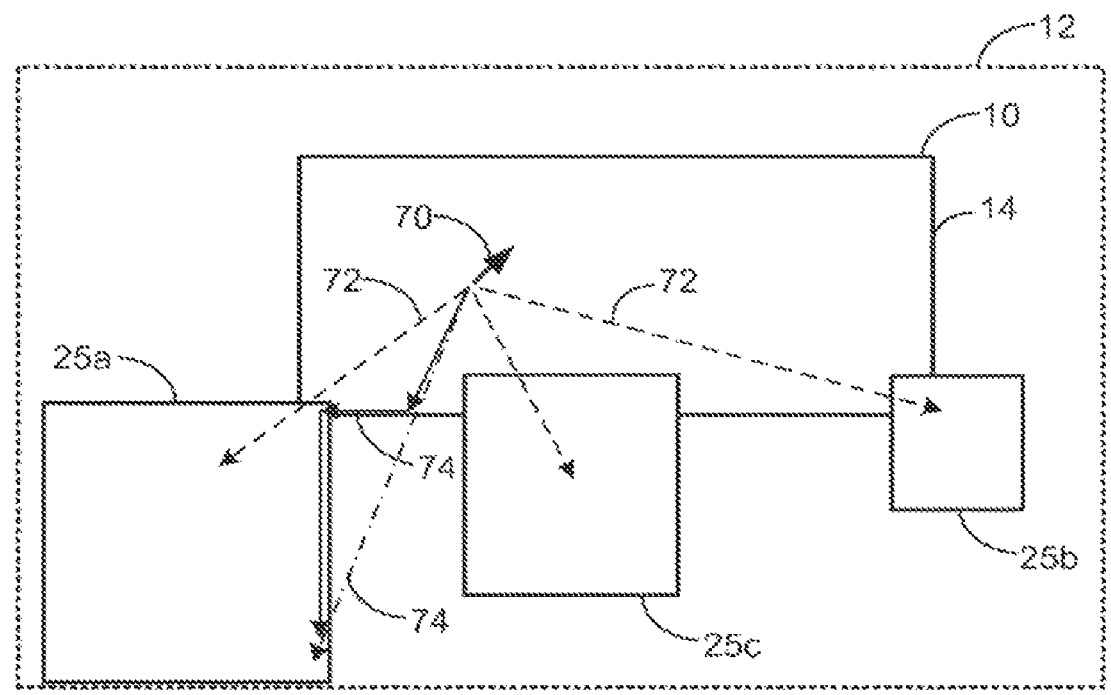
FIG. 2B shows sample permissible movements of a pointer in accordance with a specific embodiment of the present invention.

The anchor points permit movement of a pointer or manipulanda between background 10 and the graphics items 25 without discontinuous spatial jumps. Movement of the pointer in two dimensions may be prevented when one of the dimensions is not permissible. FIG. 2B shows sample movements 72 ad 74 of a pointer 70 in accordance with a specific embodiment of the present invention.

Sample movements 72 show permissible linear movements from the pointer's current position within background 10 to the graphics items 25 without any modifications to the display of the pointer movement.

Sample movement 74 shows a desired movement input by a user that is not permitted since the perimeter of background 10 or a graphics items 25 has been met (and pointer 70 is not permitted to leave both background 10 and all graphics items 25). Sample movements 76 show movements from the pointer's current position—in place of movement 74—within background 10 to the desired end location graphics items 25 in a three stage movement that accounts for the limits of background 10 to the graphics items 25. More specifically, a first segment of movement travels normally along the desired movement 74. A second stage denies display of further downward motion of pointer 70, moves the pointer 70 left along perimeter 14 of background 10, tracks the vertical position of pointer 70 as it moves downward, and then sends the pointer 70 down into graphics item 25a in a third stage when vertically permissible. The speed of pointer 70 movement in this third stage is a matter of design choice and may be varied as desired. Once within each graphics items 25, the pointer 70 may be moved normally.

Figure 3:
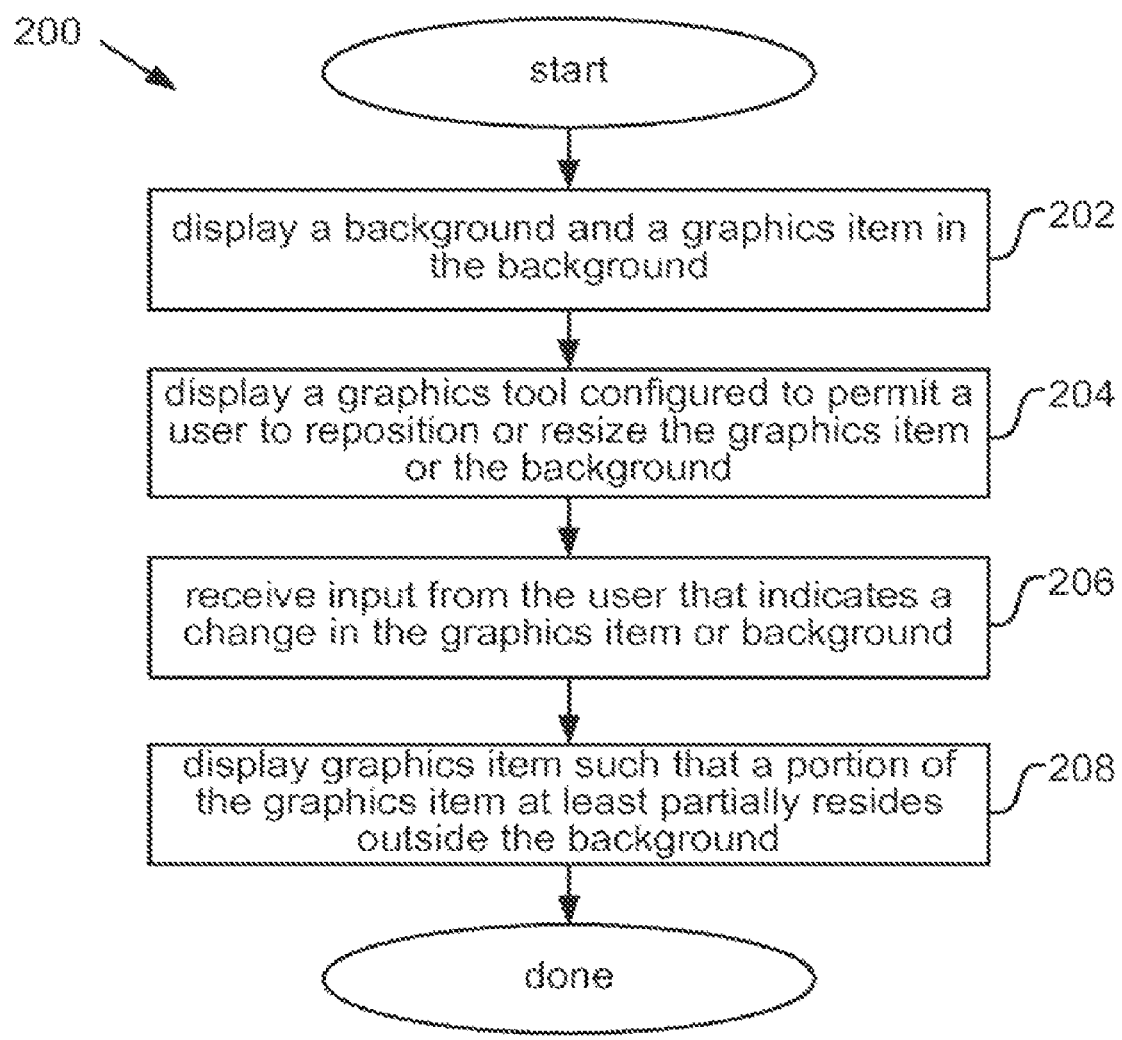
FIG. 3 illustrates a process flow for customizing an operating space included with a graphics-based user interface in accordance with one embodiment of the invention.

FIG. 3 illustrates a process flow 200 for customizing an operating space included with a graphics-based user interface in accordance with one embodiment of the invention. While the present invention will now be described as a method and separable actions for changing the size of a background, those skilled in the art will recognize that the subsequent description may also illustrate computer and software systems and components capable of performing the method and actions.

Process flow 200 begins by displaying a background and a graphics item in the background (202). Suitable display devices are described below.

Process flow 200 proceeds by displaying a graphics tool configured to permit a user to reposition or resize the graphics item or the background such that a portion of the graphics item at least partially resides outside the background (204). In one embodiment, the graphics tool includes click and drag functionality for repositioning or resizing the graphics item or the background. The graphics control is accessible to a user via one or more locations or operations in the graphics-based user interface. For example, a user may click a mouse or other input to gain access to the control tool. In another embodiment, a graphics control is provided to permit modifications to the background. Suitable examples of such a graphics control are provided in commonly owned and co-pending U.S. patent application Ser. No. 10/891,733, which is incorporated by reference herein.

The graphical user interface system then receives input from the user (206); the input indicates a change in the graphics item or a change in the background such that a portion of the graphics item resides outside the background.

In one embodiment, process flow 200 is used in conjunction with a projector as the display device. In this case, a user may manually manipulate the background and/or graphics item size and/or position according to an allowable projection path for the image or allowable area for receiving surface. For example, a graphics item may be manipulated in its outer dimensions to avoid visual obstacles in projection path or on the receiving surface. Alternatively, a background and/or graphics item may be vertically raised by a user to avoid pictures on a desk or horizontally shifted to sidestep a cabinet, filing area or other vertical obstacle.

Process flow 200 then displays the graphics item such that a portion of the graphics item at least partially resides outside the background (208). In one embodiment, after the user finishes inputting changes to the background and/or graphics item, a video adapter or processor associated with the graphics-based user interface then changes the background and/or graphics item according to the input. This may also include changing the background video information. To do so, the video adapter or processor may interrogate the display device to determine display properties of the display device, such as the display device resolution, native aspect ratio, and full-size dimensions. If the resolution for the background image or bitmap does not match the resolution provided according to the current background size and resolution of the display device, the graphics adapter or processor may alter the video information in the background bitmap. Alteration may include resolution down conversion and/or up conversion on the background video information, in equal or unequal quantities in the orthogonal image directions.

For example, if the background bitmap has a higher resolution than the current background size, the video adapter or processor may down convert video information in the bitmap according to the resolution available in the background size input by the user. Thus, if the user input a background size of 25% relative to the maximum image size, and the projector includes an optical modulator that offers 1024 by 768 resolution, then the current background size offers a 512 by 384 resolution. The graphics adaptor then down converts a bitmap having a 1024 by 768 resolution by a factor of 2 equally in both image directions to fit the current 512 by 384 resolution. Similarly, the graphics adaptor down converts a bitmap having an 800 by 600 resolution by a factor of 1.5625 equally in both image directions to fit the same resolution and background size input by the user. The user may then position this smaller image within the maximum image as desired. In a specific embodiment, the default location for a smaller image is the geometric center for the maximum image size, and the user moves the image from this location using a suitable background position control tool.

If the user input a desired background size or an aspect ratio that varies from the native aspect ratio of the background bitmap, then the video adapter may alter the video information in the bitmap to fit the current size as determined by the differing resolution ratios between the background bitmap and the current background size in each orthogonal image direction. Background bitmaps most commonly use a 4:3 aspect ratio to comply with the default 4:3 aspect ratio used by older CRT and LCD screens. For example, given a projector offering a 1024 by 768 resolution, user input for a 2:1 aspect ratio, and a 50% image size relative to the maximum image size; the current background size offers an 886 by 443 resolution. The amount of resolution conversion for an image may then be determined according to the ratio of resolution for the bitmap relative to the resolution currently offered by the background size. For example, the graphics adaptor may unequally down convert a 1024 by 768 resolution bitmap by a factor of 1.156 in the width (x) direction and by a factor of 1.734 in the length (y) direction to fit the allowable 886 by 443 resolution. Alternately, for the same background size conditions, the graphics adaptor may up convert a 800 by 600 resolution bitmap by a factor of 1.107 in the width (x) direction and down convert by a factor of 1.354 in the length (y) direction to fit the allowable 886 by 443 resolution background. Resolution up conversion and down conversion is techniques known to those skilled in the art and not described in further detail here for the sake of brevity.

Process flow 200 recognizes that graphics-based user interface design and interaction varies widely and encompasses any suitable techniques used to accept user input or change the background size based on user input. For example, some embodiments may display an arrow that operates as the background control tool in response to user placement of a pointer at a perimetric portion of the background (204). User input in this case may comprise moving the arrow or a side that the arrow is displayed on (206). In response to arrow movement, the background size changes in a direction of the arrow by an amount the arrow is moved (208). In one embodiment, changing the background size creates a new usable area for user input for the graphics-based user interface according to the new background size. Changing the background size may also reposition icons and control bars according for the new perimeter of the background. In a specific embodiment, corners of the background are used as references positions for the icons and control bars, regardless of background size.

After any changes, the graphics-based user interface may store an altered bitmap based on the changes to ease continual usage of the altered bitmap. As mentioned above, changing the background size as described herein is independent of keystone correction. The altered bitmap is then stored independent of keystone correction. Storage may alternatively include quantification of any keystone correction applied when the image was stored. Recall of the background may also then include a check to the projector to determine if the similar or different keystone correction is being used, and whether any changes in the digital image are needed.

Customization of an operating space included with a graphics-based user interface is also well suited for use in environments other than cubicles and office as described above. In general, the process flow 200 is useful in any setting in which a projector casts an image onto a limited space, such as the back seat of a car or other automobile, in an airplane, down onto a table or other horizontal surface, etc.

The present invention may also be embodied in a graphics-based user interface. The graphics-based user interface is suitable for use with computers and computer programs to facilitate interaction between a user and a computer or between the user and a computer program run on the computer.

Figure 4:
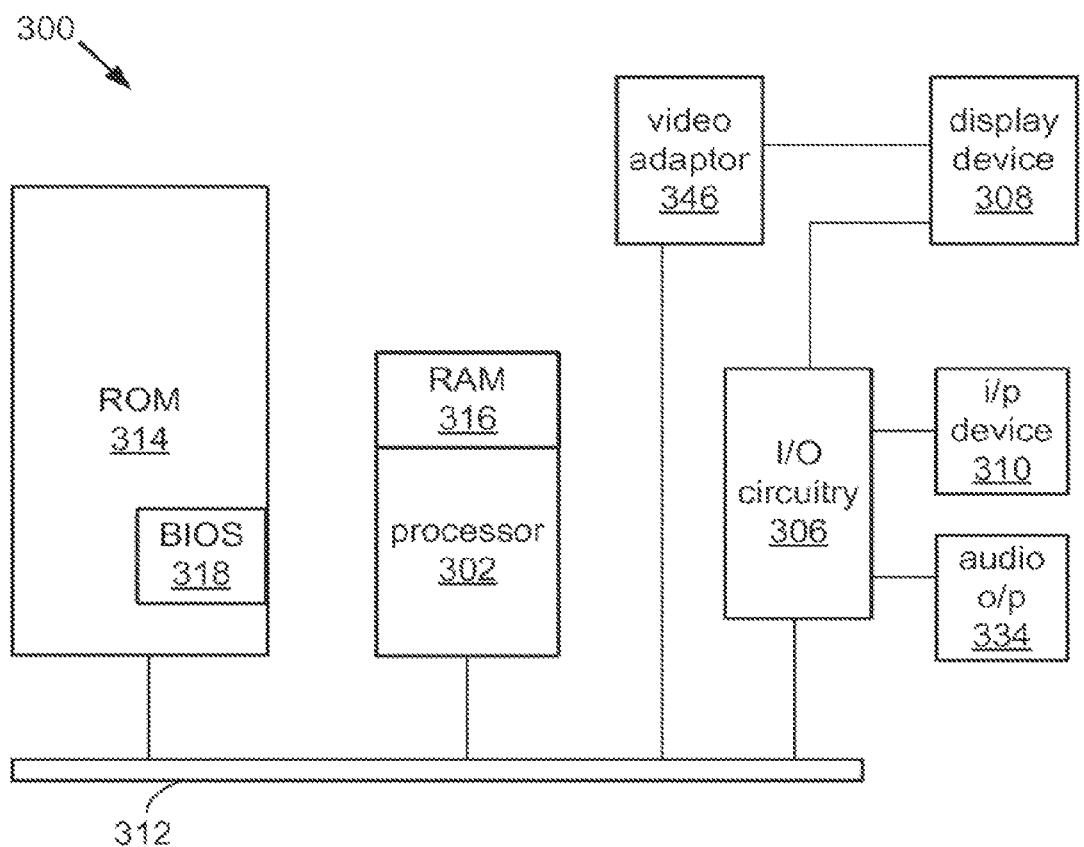
FIG. 4 illustrates an exemplary computer system suitable for implementing the invention.

The present invention thus finds use with computer systems such as desktop and laptop computers, personal digital assistants (PDAs), and the like. FIG. 4 illustrates an exemplary general-purpose computer system 300, representing a personal computer suitable for implementing the present invention.

Computer system 300 comprises a processor, or CPU, 302, one or more memories 314 and 316, input/output (I/O) circuitry 306, display device 308, input device 310, and system bus 312. System bus 312 permits digital communication between system processor 302 and ROM 314, as well as permits communication between other items within system 300 and processor 302 and/or ROM 314.

System 300 memory includes read only memory (ROM) 314 and random access memory (RAM) 316. Other memories may be included, such as another RAM module that separately couples to bus 312. ROM 314 stores a basic input/output system 318 (BIOS), containing basic routines that help to transfer information between elements within computer system 300, such as during start-up. Computer system 300 may also include a hard disk drive and an optical disk drive, for example. The optical disk drive reads from and may write to a CD-ROM disk or other optical media. The drives and their associated computer-readable media provide non-volatile storage for system 300. A number of program modules may be stored in the drives, ROM 314, and/or RAM 316, including an operating system, one or more application programs, other program modules, and program data. Although data storage above refers to a hard disk and optical disk, those skilled in the art will appreciate that other types of storage are suitable for use with a computer system, such as magnetic cassettes, flash memory cards, USB memory sticks, and the like. In addition, not all computer systems, such as PDAs and other portable devices may include multiple external memory options.

Processor 302 is a commercially available microprocessor such as one of the Intel or Motorola family of chips, or another suitable commercially available processor. Processor 302 digitally communicates with ROM 314 via system bus 312, which may comprise a data bus, control bus, and address bus for communication between processor 302 and memory 314. CPU 302 is also coupled to the I/O circuitry 306 by system bus 312 to permit data transfers with peripheral devices.

I/O circuitry 306 provides an interface between CPU 302 and such peripheral devices as display device 308, input device 310, audio output 334 and/or any other I/O device. For example, a mouse used as input device 310 may digitally communicate with processor 302 through a serial port 306 that is coupled to system bus 312. Other interfaces, such as a game port, a universal serial bus (USB) or fire wire, may also provide digital communication between a peripheral device and processor 302. I/O circuitry 306 may also include latches, registers and direct memory access (DMA) controllers employed for interface with peripheral and other devices.

Audio output 334 may comprise one or more speakers employed by a headphone or speaker system.

Display device 308 is for displaying objects, video information, backgrounds as described herein, graphics controls as described herein, graphics-based user interfaces as described herein, and other visual representations of data. Display device 308 may comprise a cathode ray tube (CRT), liquid crystal display (LCD), organic light emitting diode (OLED), or plasma display, of the types commercially available from a variety of manufacturers. Display device 308 may also comprise one or more optical modulation devices, or the like, used in projecting an image. Projection display devices that project an image onto a receiving surface are becoming more popular, less expensive, more compact; and may employ one or more optical modulation technologies as well as a variety of individual designs. Common optical modulation devices include those employing liquid crystal display (LCD) technology and digital mirror device (DMD) technology. When used as a display device for a computer, these projection devices provide the potential for a much larger image size and user interface. Since images output by these devices may encounter keystone distortion, many projectors are designed or configured to mechanically or digitally reduce keystone distortion—either by manual (user) feedback or automated feedback using one or more sensors.

Display device 308 may also digitally communicate with system bus 306 via a separate video interface, such as a video adapter 346. Video adapter 346 may be responsible for assisting processor 302 with video graphics processing, and may be responsible for such functions as resolution up conversion, down conversion and—suppression of portions of a maximum image size not being used. Video adapter 346 may be a separate graphics card or graphics processor available from a variety of vendors that are well known in the art.

Input device 310 allows a user to enter commands and information into the computer system 300, and may comprise a keyboard, a mouse, a position-sensing pad on a laptop computer, a stylus working in cooperation with a position-sensing display on a PDA, or the like. Other input devices may include a remote control (for a projector), microphone, joystick, game pad, scanner, or the like. As used herein, input device refers to any mechanism or device for entering data and/or pointing to a particular location on an image of a computer display. Input as described herein may also come through intermediary devices. For example, a remote control may communicate directly with processor 302, or through an intermediary processor included in another device such as a hybrid entertainment device such as a set-top box or projector. The user may then input information to computer system 300 using an infrared remote control device that communicates first with the intermediary device, and then to processor 302.

In operation, input device 310 allows a user to enter input such as commands and information related to a desired background or graphics item size or position. The user input may then be analyzed by processor 302 to determine desired video information and set up changes, such as repositioning icons. If desired, visual feedback may be given to the user at various stages of the input and background change via display device 308. In one embodiment, a graphics-based user interface implemented by computer system 300 is programmed to respond to commands from processor 302 to display graphics controls such as those described above. To display a particular graphics control, processor 302 issues an appropriate command, followed by an identification of data that is to be used to construct the graphics control. As described above, such data comprises a number of background control tools that allow a user to change a background size, when displayed. The graphics control may then store and call a bitmap of pixel values relating to each background control tool displayed thereon. System memory 304 may also store a bitmap or similar file that corresponds to an image previously used as the background. The present invention may be practiced in the context of an application program that runs on an operating system implemented by computer system 300 or in combination with other program modules on computer system 300.

In one embodiment, a graphics-based user interface implemented by computer system 300 displays a graphics control. To display a power conservation graphics control, processor 302 issues an appropriate command, followed by an identification of data that: is to be used to construct the graphics control. Such data may include a number of power conservation control tools that allow a user to change how video data is altered and power is conserved. ROM 314 also stores a number power conservation commands and instructions for implementing the techniques described herein. In one embodiment, the present invention is practiced in the context of an application program that runs on an operating system implemented by computer system 300 or in combination with other program modules on computer system 300.

The present invention may be practiced using a range of computer systems. In addition to personal computers such as desktop computers and laptop computers, a variety of other computer systems and computer devices employing a digital processor, memory and a display device may implement the present invention. Handheld computers and other small portable digital devices such as cell phones and digital cameras are increasingly integrating computer functionality, including the ability to access the resources of an external network such as the Internet and the ability to output video data to external devices. One current trend is hybrid entertainment devices that integrate the functionality of computer systems, stereos, and televisions. In addition, set-top boxes associated with cable television services are becoming much more sophisticated user interfaces as interactive services become available to cable customers. Any of these devices may employ and benefit from graphics-based user interfaces, backgrounds, control graphics, techniques, and methods described herein.

The scope of digital computer systems is expanding hurriedly and creating many systems and devices that may employ the present invention. A merging of television, video, and computer functions into a single device also adds value to the present invention since the sensitivity to image quality and size is high in applications such as motion picture viewing. Video game consoles that use large display devices and game related graphics user interfaces may also benefit from the present invention. In this case, user input tools may comprise joysticks, game pads, driving wheels and other video game interfaces. In general, any digital device that employs an output display device such as a projector, LCD device, plasma device, etc., for improved image display and control may benefit from the present invention. In addition, the projector, LCD device or plasma device may itself include its own graphics-based user interface that employs systems and methods described herein. Moreover, those skilled in the art will appreciate that the invention may be practiced with other computer system configurations, multiprocessor systems, microprocessor-based or programmable consumer electronics, minicomputers, mainframe computers, and the like. The present invention may also be practiced on any system running a graphics-based user interface from a computer-readable memory such as internal electronic memory, magnetic-based mass storage, and/or optical-based mass storage. The memory is programmed to implement the techniques described above.

Embodiments further relate to computer readable media that include program instructions for performing power conservation techniques described herein. The media and program instructions may be those specially designed and constructed for the purposes of the present invention, or any kind well known and available to those having skill in the computer software arts. Examples of computer-readable media include, but are not limited to magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

Graphics controls and graphics-based user interfaces such as those described herein may be implemented using a number of computer languages and in a number of programming environments. One suitable language is Java, available from Sun Microsystems of Sunnyvale, Calif. Another suitable programming environment is the Microsoft Window® programming environment, which provides a series of operating systems suitable for implementing the present invention both on laptop computers and handheld computers.

Although the foregoing invention has been described in some detail for purposes of clarity of understanding, those skilled in the art will recognize that various modifications may be made within the scope of the appended claims. Such a graphic may include a pie chart that quantifies a percentage of the maximum image size being used. The invention is, therefore, not limited to the specific features and embodiments described herein and claimed in any of its forms or modifications within the scope of the appended claims.

What is claimed is:

1. A method, comprising:
   displaying, via a display device having a configured maximum image size visible for display, a background defining an operating space for a graphical user interface;
   receiving an input, via an input device, indicating a resizing of the background to a size that is less than the configured maximum image size visible for display; and
   displaying, via the display device, the background resized to the size that is less than the configured maximum image size visible for display in response to receiving the input.

2. The method of claim 1, further comprising
   defining an anchor for a graphics item, wherein the anchor is within a border of the graphics item; and
   displaying, via the display device, the graphics item, wherein the anchor is within a border of the background.

3. The method of claim 2, wherein defining the anchor further comprises defining the anchor as at least one point location shared by the graphics item and the background.

4. The method of claim 2, wherein defining the anchor further comprises defining the anchor to comprise at least one point location that lies on a straight line between a geometric center of the graphics item and a geometric center of the background.

5. The method of claim 2, wherein defining the anchor further comprises defining the anchor in relation to a geometric center of the background.

6. The method of claim 2, further comprising:
   receiving another input, via the input device, indicating a change in size or position of the graphics item or the background that results in the anchor point not being within the border of the background; and
   denying the change.

7. The method of claim 1, further comprising displaying an interface of a graphics tool, wherein receiving the input further comprises receiving the input according to the displaying of the interface of the graphics tool.

8. The method of claim 1, further comprising:
   receiving another input, via the input device, indicating a change in size of a graphics item displayed on the display;
   resizing, based on the another input indicating a change in size of the graphics item, the graphics item within the configured maximum image size visible for display, wherein a portion of the graphics item resides outside of a border of the background; and
   customizing the operating space to include the portion of the graphics item that resides outside of the border of the background.

9. The method of claim 1, further comprising:
   receiving another input, via the input device, indicating a change in position of a graphics item displayed on the display;
   repositioning, based on the another input indicating a change in position of the graphics item, the graphics item within the configured maximum image size visible for display, wherein a portion of the graphics item resides outside of a border of the background; and
   customizing the operating space to include the portion of the graphics item that resides outside of the border of the background.

10. The method of claim 2, further comprising:
    turning, to an off state, pixels of the display device outside of the borders of the graphic item and background.

11. The method of claim 10, wherein turning to an off state comprises setting the pixels to zero or black, or stopping light being transmitted associated with the pixels.

12. The method of claim 1, further comprising:
    receiving an input, via the input device, indicating a change in position of the background; and
    repositioning, based on the input, the background within the configured maximum image size visible for display.

13. The method of claim 8, 9, or 12, further comprising:
    determining display properties of the display device; and
    modifying at least one of the graphics item or background based on the display properties.

14. The method of claim 13, wherein the determining the display properties further comprises determining at least one of a resolution of the display device or a native aspect ratio of the display device.

15. The method of claim 13, wherein the modifying at least one of the graphics item or background further comprises at least one of resolution down converting or resolution up converting of video information associated with the graphics item.

16. A system, comprising:
    means for displaying a background on a display having a configured visible maximum image size, wherein the background defines an operating space for a graphical user interface;
    means for receiving an input indicating a resizing of the background to a size that is less than the configured visible maximum image size; and means for displaying the background resized to the size that is less than the configured visible maximum image size.

17. The system of claim 16, further comprising:
means for defining an anchor for a graphics item, wherein the anchor is within a border of the graphics item; and
means for displaying the graphics item, wherein the anchor is within a border of the background.

18. The system of claim 16, wherein the means for defining the anchor further comprises defining the anchor to comprise at least one point location that lies on a straight line between a geometric center of the graphics item and a geometric center of the background.

19. The system of claim 16, wherein the means for defining the anchor further comprises defining the anchor in relation to a geometric center of the background.

20. The system of claim 16, further comprising:
means for receiving another input indicating a change in size or position of the graphics item or background that would result in the anchor point not being within the border of the background; and
means for denying the change.

21. A non-transitory computer-readable media having stored thereon computer executable instructions that, in response to execution, cause at least one computing device to perform operations comprising:
displaying, via a display device having a configured maximum image size visible for display, a background, wherein the background defines an operating space for a graphical user interface;
receiving, via an input device, an input indicating a resizing of the background to a size that is less than the configured maximum image size visible for display; and
displaying, via the display device, the background resized to the size that is less than the configured maximum image size visible for display according to the input.

22. The non-transitory computer-readable media of claim 21, the operations further comprising:
defining an anchor for a graphics item, wherein the anchor is within a border of the graphics item; and
displaying, via the display device, the graphics item, wherein the anchor is within a border of the background.

23. The non-transitory computer-readable media of claim 21, the operations further comprising:
receiving another input, via the input device, indicating a change in size or position of the graphics item or background that would result in the anchor point not being within the border of the background; and
denying the change.

24. An apparatus, comprising:
at least one computing device configured to:
display a background on a display device having a configured visible maximum image size, wherein the background defines an operating space for a graphical user interface;
receive an input indicating a resizing of the background to a size that is less than the configured visible maximum image size; and
display the background resized to the size that is less than the configured visible maximum image size.

25. The apparatus of claim 24, wherein the at least one computing device is further configured to:
determine an anchor for a graphics item, wherein the anchor is within a border of the graphics item
display the graphics item, wherein the anchor is within a border of the background.

26. The system of claim 16, further comprising:
means for receiving another input, via the input device, indicating a change in size of a graphics item displayed on the display;
means for resizing, based on the another input indicating a change in size of the graphics item, the graphics item within the configured maximum image size visible for display, wherein a portion of the graphics item resides outside of a border of the background; and
means for customizing the operating space to include the portion of the graphics item that resides outside of the border of the background.

27. The system of claim 16, further comprising:
means for receiving another input, via the input device, indicating a change in position of a graphics item displayed on the display;
means for repositioning, based on the another input indicating a change in position of the graphics item, the graphics item within the configured maximum image size visible for display, wherein a portion of the graphics item resides outside of a border of the background; and
means for customizing the operating space to include the portion of the graphics item that resides outside of the border of the background.

28. The non-transitory computer-readable media of claim 21, further comprising:
receiving another input, via the input device, indicating a change in size of a graphics item displayed on the display;
resizing, based on the another input indicating a change in size of the graphics item, the graphics item within the configured maximum image size visible for display, wherein a portion of the graphics item resides outside of a border of the background; and
customizing the operating space to include the portion of the graphics item that resides outside of the border of the background.

29. The non-transitory computer-readable media of claim 21, further comprising:
receiving another input, via the input device, indicating a change in position of a graphics item displayed on the display;
repositioning, based on the another input indicating a change in position of the graphics item, the graphics item within the configured maximum image size visible for display, wherein a portion of the graphics item resides outside of a border of the background; and
customizing the operating space to include the portion of the graphics item that resides outside of the border of the background.

30. The apparatus of claim 24, wherein the at least one computing device is further configured to:
receive another input, via the input device, indicating a change in size of a graphics item displayed on the display; and
resize, based on the another input indicating a change in size of the graphics item, the graphics item within the configured maximum image size visible for display, wherein a portion of the graphics item resides outside of a border of the background; and customize the operating space to include the portion of the graphics item that resides outside of the border of the background.

31. The apparatus of claim 24, wherein the at least one computing device is further configured to:

receive another input, via the input device, indicating a change in position of a graphics item displayed on the display;

reposition, based on the another input indicating a change in position of the graphics item, the graphics item within the configured maximum image size visible for display, wherein a portion of the graphics item resides outside of a border of the background; and customize the operating space to include the portion of the graphics item that resides outside of the border of the background.

* * * * *

UNITED STATES PATENT AND TRADEMARK OFFICE
CERTIFICATE OF CORRECTION

| | |
|---|---|
| PATENT NO. | : 8,130,241 B2 |
| APPLICATION NO. | : 13/037945 |
| DATED | : March 6, 2012 |
| INVENTOR(S) | : Plut |

Page 1 of 1

It is certified that error appears in the above-identified patent and that said Letters Patent is hereby corrected as shown below:

Column 15, line 52, in Claim 2, delete "comprising" and insert -- comprising: --.

Column 18, line 2, in Claim 25, delete "item" and insert -- item; --.

Signed and Sealed this
Eleventh Day of September, 2012

David J. Kappos
*Director of the United States Patent and Trademark Office*